United States Patent Office 3,372,155
Patented Mar. 5, 1968

3,372,155
MIXED CHROMIUM COMPLEX
MONOAZO DYESTUFFS
Gerhard Dittmar, Leverkusen, and Walter Scholl,
Cologne-Mulheim, Germany, assignors to Farbenfabriken Bayer Aktiengesellschaft, Leverkusen,
Germany, a corporation of Germany
No Drawing. Filed Feb. 26, 1964, Ser. No. 347,386
Claims priority, application Germany, Feb. 28, 1963,
F 39,137
2 Claims. (Cl. 260—145)

The present invention relates to a group of unique mixed chromium complex azo dyestuffs, and to an improved process for the preparation of the same.

The invention is based, at least in part, on the discovery that valuable mixed chromium complex azo dyestuffs may be produced by reacting chromium-yielding agents with a mixture of monoazodyestuffs of the formulae:

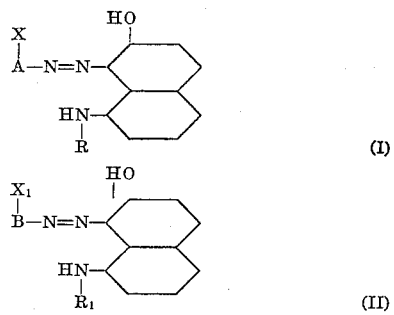

in admixture with further metallizable dyestuffs if desired, in such manner that 2:1-chromium complexes are formed, or by reacting the 1:1-chromium complex compound of one of the monoazo dyestuffs I and II, and preferably of dyestuff I, with the second metal-free dyestuff to form the 2:1-chromium complex compound.

With reference to the foregoing formulae, A and B represent radicals of the diazo components, preferably radicals of the benzene series, in each of which the substituents X and $X_1$ are in the o-position to the azo grouping; X and $X_1$ represent metal complex-forming groups or such substituents which are transformed into metal complex-forming groups under metallizing conditions, R represents an alkylsulfonyl or arylsulfonyl group, and $R_1$ represents an acyl radical different from that represented by R.

A preferred method of effecting the process of the invention consists of reacting a mixture of two monoazodyestuffs of the formulae:

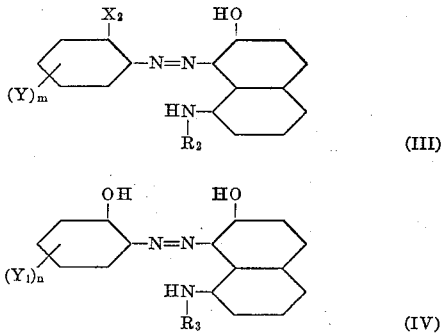

and in admixture with other metallizable azo dyestuffs, if desired, with a chromium-yielding agent for the formation of 2:1-chromium complexes, or by reacting the 1:1-chromium complex compound of a monoazodyestuff III with a metal-free dyestuff IV to form the 2:1-chromium complex dyestuff.

With reference to Formulae III and IV above, $X_2$ represents a hydroxyl or alkoxy group; Y and $Y_1$ represent hydrogen or non-ionic substituents; $m$ and $n$ are the integers 1 or 2; $R_2$ represents an alkylsulfonyl or arylsulfonyl group; and $R_3$ represents an alkylsulfonyl or arylsulfonyl group different from that represented by $R_2$, or for the acyl radical of an aliphatic or aromatic carboxylic acid.

The monoazodyestuffs I and III utilized in the process of the invention differ from each other at least with respect to the tape of their acyl substituent R or $R_1$. If, in both cases alkylsulfonyl or arylsulfonyl radicals are present, they must not, by definition, be identical. The difference between the acyl radicals R and $R_1$ may also be due to the fact that R is derived from an aliphatic or aromatic sulfonic acid, whereas $R_1$ is derived from an aliphatic or aromatic carboxylic acid.

A particularly desirable dyestuff of this invention comprises the mixed chromium complex azo dyestuff which contains in complex union one atom of chromium and two molecules of different monoazo dyestuffs of the formulae:

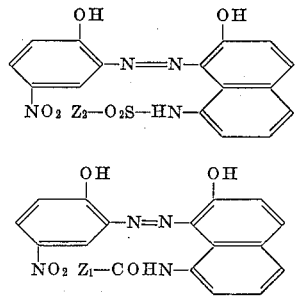

and

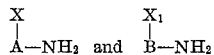

wherein $Z_1$ stands for methyl, ethyl, or phenyl, and $Z_2$ stands for methyl, ethyl, phenyl, or p-methylphenyl.

The diazo compounds in dyestuffs I and II $$\overset{X}{\underset{A}{|}}-NH_2 \text{ and } \overset{X_1}{\underset{B}{|}}-NH_2$$

may be identical or different in constitution. Preferably, however, they belong to the benzene series. If the diazo components are further substituted, nonionic constituents are preferred in many cases as, for example, alkyl, alkoxy, nitro, etc., and optionally further substituted sulfonamido, sulfone, acylamino and halogen substituents. The preferred dyestuffs to be used in the process of the invention are those represented by Formulae III and IV. Naturally, dyestuffs with acid, water-solubilizing groups such as sulfonic acid, and not complex-linked carboxylic acid groups may also be used in practicing the process of the invention.

As metal complex-forming groups X and $X_1$, which in the radicals A and B stand in an adjacent position to the azo group, hydroxy or alkoxy groups are to be considered preferred. Additionally, the carboxylic acid group is also entirely satisfactory for this purpose. Substituents capable of being transformed into metal complex-linked groups under metallizing conditions include, for example, —$SO_3H$ and —Cl.

The monoazodyestuffs which may be used in the process of the invention are, for example:

4-nitro-2-aminophenol→1-methyl-sulfonylamino-7-hydroxynaphthalene;
5-nitro-2-aminophenol→1-methyl-sulfonylamino-7-hydroxynaphthalene;
4-chloro-2-aminophenol→1-methyl-sulfonylamino-7-hydroxynaphthalene;
5-chloro-2-aminophenol→1-methyl-sulfonylamino-7-hydroxynaphthalene;

2-aminophenol-4-sulfonamide→1-methyl-sulfonylamino-7-hydroxynaphthalene;
2-aminophenol-4-sulfomethylamide→1-methyl-sulfonylamino-7-hydroxynaphthalene;
2-aminophenol-4-sulfodimethyl-amide→1-methylsulfonylamino-7-hydroxynaphthalene;
2-aminophenol-4-methylsulfone→1-methylsulfonylamino-7-hydroxynapthhalene;
2-aminophenol-4-ethylsulfone→1-methylsulfonylamino-7-hydroxynaphthalene;
2-aminophenol-5-sulfoamide→1-methyl-sulfonylamino-7-hydroxynaphthalene;
2-aminophenol-5-methyl-sulfone→1-methyl-sulfonylamino-7-hydroxynaphthalene;
2-aminophenol-5-ethylsulfone→1-methyl-sulfonylamino-7-hydroxynaphthalene; and
4-nitro-2-aminophenol→1-(p-toluene)-sulfonylamino-7-hydroxynaphthalene.

As the monoazodyestuffs II or IV, there may be used, among others:

4-nitro-2-aminophenol→1-acetylamino-7-hydroxynaphthalene;
5-nitro-2-aminophenol→1-acetylamino-7-hydroxynaphthalene;
2-aminophenol-4-sulfonamide→1-acetylamino-7-hydroxynaphthalene;
2-aminophenol-4-ethylsulfone→1-acetylamino-7-hydroxynaphthalene;
2-aminophenol-5-methylsulfone→1-acetylamino-7-hydroxynaphthalene;
2-aminophenol-5-sulfodimethylamide→1-acetylamino-7-hydroxynaphthalene;
4-chloro-2-aminophenol→1-acetylamino-7-hydroxynaphthalene;
5-chloro-2-aminophenol→1-acetylamino-7-hydroxynaphthalene;
4-nitro-2-aminophenol→1-benzoylamino-7-hydroxynaphthalene;
2-aminophenol-4-sulfonamide→1-(p-methylbenzoylamino)-7-hydroxynaphthalene; and
2-aminophenol-4-sulfonamide→1-(p-toluenesulfonylamino)-7-hydroxynaphthalene.

Preparation of those monoazo dyestuffs may be effected by known techniques such as by coupling the diazo component listed initially in each case (i.e., preceding the arrow) within, preferably, an aqueous alkaline medium with the coupling component listed secondly in each case (i.e., following the arrow). For the preparation of the 1:1-chromium compounds, various methods are known from prior literature sources. Especially advantageous are those methods which are carried out at temperatures within the range of from 100–150° C. in open vessels, or under pressure within organic solvents, such as ethylene glycol, with simple chromium salts, such as chromium acetate, chromium formate or chromium chloride, or in a weakly acid medium (see for example, German Patent No. 479,373; Journal of the Chemical Society, London, 1938, p. 830).

The reaction of the 1:1-complex compounds with the metal-free monoazo dyestuffs takes place in an aqueous, organic-aqueous or organic medium in the weakly acid, neutral or, preferably, weakly alkaline range. In reacting chromium-yielding agents on mixtures of monoazo dyestuffs of the general Formulae I and II or III and IV, chroming methods are used, mostly within an alkaline medium, which, according to experience yield 2:1-complex compounds. Such methods include, for example, the reaction with alkali metal chromates in the presence of reducing carbohydrates or chroming with ammonium salicylate-chromium-III complexes.

In mixed chroming, further metal complex-forming dyestuffs may be employed apart from dyestuffs I and II, which is occasionally desirable in order to produce certain color shades. First, mixtures of more than one each of the dyestuffs represented by Formulae I and II may be employed. It is also possible to introduce metallizable azo dyestuffs of a different basic structure as, for example, those which are synthesized from diazo components of the benzene or naphthalene series and phenolic coupling components other than 1-acylamino-7-hydroxynaphthalene such, for example, from diazo components of the benzene series with o-positioned hydroxy, alkoxy or carboxy groups and 1-hydroxy-5,8-dichloro- or -dibromo-naphthalene; 2-hydroxynaphthalene; 2-hydroxynaphthalene-3,6-disulphonic acid amides; 1-hydroxy-4-alkylnaphthalenes; 4'-hydroxynaphtho-(2',1':4,5)-oxathiol-5-dioxide, and others. Especially suitable also are those metallizable monoazo dyestuffs which are obtained from diazo components of the benzene series with a hydroxyl, alkoxy, or carboxy group in o-position, and enolic coupling components, such as acylacetic acid amides, especially aryl amides, 5-pyrazolones, particularly 1-aryl-3-methyl-5-pyrazolones, or 5-amino pyrazoles, especially 1-aryl-3-methyl-5-aminopyrazoles. Dyestuffs of this type are known in large numbers from the prior literature available on chromium complex azo dyestuffs.

Apart from metal complex-forming azo dyestuffs other metal complex-forming dyestuffs, such as azomethine dyestuffs or the like, may, of course, be used for the mixed chroming as additional metallizable dyestuff components.

The new mixed chromium complex azo dyestuffs of the invention are readily water-soluble in the form of their alkali metal salts. They are effective in dyeing wool and materials of similar dye receptivity, such as silk, leather, synthetic polyamide and polyurethane fibers, in very fast, level colors, fast to rubbing. In dyeing wool, for example, dyeing techniques in weakly acid (organic acid) as well as in neutral baths are very suitable.

It is believed that the invention may be best understood by reference to the following specific examples illustrating the application of the foregoing principles and procedures in the preparation of typical mixed chromium complex azo dyestuffs of the invention and their utilization in dyeing techniques on typical substates, and wherein the respective parts by weight and parts by volume indicated stand in the ratio of grams to milliliters:

*Example I*

The monoazo dyestuff 4-nitro-2-aminophenol→1-methyl-sulphonylamino-7-hydroxynaphthalene, in amount of 40.2 parts by weight (obtained according to the method of German Patent No. 951,749), was stirred in 600 parts by volume of ethylene glycol; 26.6 parts by weight of crystallized chromic chloride were added and the mixture was heated at 125–130° C. for 4 hours while stirring. Thereafter, 36.6 parts by weight of the monoazo dyestuff 4-nitro-2-aminophenol→1-acetylamino-7-hydroxynaphthalene and 150 parts by volume of formamide were added, and the reaction solution was heated for one (1) hour to 100–105° C. The mixture was then poured into 4000 parts by volume of water, 600 parts by weight of rock salt were dropped in and the precipitated mixed chromium complex dyestuff of the supposed formula:

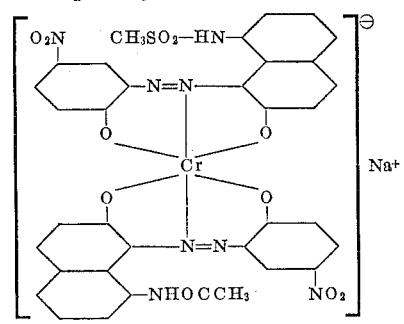

was filtered-off by suction. After dyeing, a dark powder was obtained which dyed wool from a neutral to organic acid bath in bluish olive shades.

Example 2

The monoazo dyestuff 4-nitro-2-aminophenol→1-methylsulphonylamino-7-hydroxynaphthalene, in amount of 40.2 parts by weight, and 36.6 parts by weight of the monoazo dyestuff 4-nitro-2-aminophenyl→1-acetyl-amino-7-hydroxynaphthalene were well stirred with 3500 parts by volume of water at 95° C., and dissolved by the addition of 23 parts by volume of a 40% by volume sodium hydroxide solution. Directly afterwards a solution of 17.8 parts by weight of sodium dichromate ($Na_2Cr_2O_7 2H_2O$) and 16.3 parts by weight of grape sugar in 210 parts by volume of water and 85 parts by volume of ammonia water (25%) were run in the mixture. This was stirred for 45 minutes at 98–100° C. and during this time 3.5 parts by volume of a 40% by volume sodium hydroxide solution were also added. The chroming mixture was then cooled with ice to 75° C. and 200 parts by weight of rock salt were dropped in. The mixture was further stirred for a short time and then the precipitated mixed chromium complex azo dyestuff was filtered-off on a suction filter. After drying, a dark powder was obtained which dyed wool from an organic acid to neutral bath in fast and level bluish olive shades.

Dyestuffs of similar behavior were obtained if, in each case, the following monoazo dyestuff combinations were subjected to mixed chroming:

(a) 4-nitro-2-aminophenol→1-methyl-sulphonylamino-7-hydroxynaphthalene and 4-nitro-2-aminophenol→1-benzoylamino-7-hydroxynaphthalene;

(b) 4-nitro-2-aminophenol→1-(p-toluenesulphonylamino)-7-hydroxynaphthalene and 4-nitro-2-aminophenol→1-acetylamino-7-hydroxynaphthalene;

(c) 4-nitro-2-aminophenol→1-(p-toluene-sulphonylamino)-7-hydroxynaphthalene and 4-nitro-2-aminophenol→1-benzoylamino-7-hydroxynaphthalene; and (d) 4-nitro-2-aminophenol→1-methylsulphonylamino-7-hydroxynaphthalene and 4-nitro-2-aminophenol→1-(p-toluenesulphonylamino)-7-hydroxynaphthalene.

Example 3

The monoazo dyestuff 1-amino-2-methoxy-6-nitrobenzene→1-methyl-sulphonylamino-7-hydroxy-naphthalene, in amount of 41.6 parts by weight, was stirred into 600 parts by volume of ethylene glycol, 26.8 parts by weight of crystalline chromic chloride were added, and the mixture was heated for 7 hours to 150–155° C. It was then allowed to cool to 120° C. and 36.6 parts by weight of the monoazo dyestuff 4-nitro-2-aminophenol→1-acetylamino-7-hydroxynaphthalene and 150 parts by volume of formamide were added. The reaction solution was maintained at 100–105° C. for a further 90 minutes and then poured into 4500 parts by volume of water. By dropping in 670 parts by weight of rock salt the mixed chromium complex dyestuff was separated. After filtering-off by suction and drying, a dark powder was obtained which dyed wool from an organic acid to neutral bath in fast and level blue-grey shades.

Example 4

The monoazo dyestuff 2-aminophenol-4-sulphonamide→1-methyl-sulphonylamino-7-hydroxynaphthalene, in amount of 43.6 parts by weight, was stirred into 600 parts by volume of ethylene glycol, 26.6 parts by weight of crystaline chromic chloride were added and the mixture heated, while stirring, to 125–130° C. for 4 hours. It was then allowed to cool to 110° C. and 40.0 parts by weight of the monoazo dyestuff 2-amino-phenol-4-sulphonamide→1-acetylamino-7-hydroxynaphthalene and 150 parts by volume of formamide were added. The reaction solution was stirred for 60 minutes at 100° C. and then poured into 4000 parts by volume of water and the mixed chromium complex dyestuff was separated by dropping in 600 parts by weight of rock salt. After filtering by suction and drying, a dark powder was obtained which dyed wool from an organic acid to neutral bath in fast and level grey shades.

Example 5

The monoazo dyestuff 2-aminophenol-4-sulphonamide→1-methyl-sulphonylamino-7-hydroxynaphthalene, in amount of 43.6 parts by weight, was transformed into the 1:1-chrdomium complex dyestuff as described in Example 4. The chroming mixture was allowed to cool to 100° C., and then 36.6 parts by weight of the monoazo dyestuff 4-nitro-2-aminophenol→1-acetylamino-7-hydroxynaphthalene and 150 parts by volume of formamide were added and the mixture was stirred for a further 60 minutes at 100° C. The reaction mixture was then poured into 4000 parts by volume of water. In order to separate the dyestuff, 600 parts by weight of rock salt were dropped into the mixture which was filtered by suction. After drying, a black powder was obtained which dyed wool from an organic acid to neutral bath in fast and level gray shades.

Example 6

The monoazo dyestuff 4-nitro-2-aminophenol→1-methylsulphonylamino-7-hydroxynaphthalene, in amount of 40.2 parts by weight; 36.6 parts by weight of the monoazo dyestuff 4-nitro-2-aminophenol→1-acetylamino-7-hydroxynaphthalene, and 37.6 parts by weight of the monoazo dyestuff 2-aminophenol-4-sulphonamide→acetoacetic acid anilide were stirred with 4500 parts by volume of water, heated to 95° C. and dissolved by the addition of 35 parts by volume of a 40% by volume sodium hydroxide solution. A solution of 26.4 parts by weight of sodium dichromate and 24.3 parts by weight of grape sugar in 300 parts by volume of water and 200 parts by volume of ammonia water (25%) was then run in quickly. The mixture was stirred for about 40 minutes at 98–100° C., cooled with ice to 70° C. and 1000 parts by weight of common salt were dropped in. After filtering-off by suction and drying, a dark powder was obtained which was readily water-soluble and dyed wool from an organic acid to neutral bath in fast and level olive shades.

If using in this example or in the procedure of one of the foregoing examples the mixtures of two metal-free dyestuffs of the following list for chroming the mixture, or the 1:1-chromium complex of the one monoazo dyestuff for reaction with the other metal-free monoazo dyestuff, mixed 2:1-chromium complex dyestuffs are obtainable which exhibit likewise very good fastness properties and which dye wool in the shades mentioned below.

| | |
|---|---|
| (a) 4-nitro-2-aminophenol→1-benzenesulphonylamino-7-hydroxynaphthalene, 4-nitro-2-aminophenol→1-propionylamino-7-hydroxynaphthalene. | Olive. |
| (b) 4-nitro-2-aminophenol→1-methylsulphonylamino-7-hydroxynaphthalene, 4-chloro-2-aminophenol→1-propionylamino-7-hydroxynaphthalene. | Greenish grey. |
| (c) 5-nitro-2-aminophenol→1-methylsulphonylamino-7-hydroxynaphthalene, 4-chloro-2-aminophenol→1-propionylamino-7-hydroxynaphthalene. | Greenish blue-grey |
| (d) 5-nitro-2-aminophenol→1-methylsulphonylamino-7-hydroxynaphthalene, 2-aminophenol-4-sulphomethylamide→1-acetylamino-7-hydroxynaphthalene. | Do. |
| (e) 4-chloro-2-aminophenol→1-methylsulphonylamino-7-hydroxynaphthalene, 4-nitro-2-aminophenol→1-acetylamino-7-hydroxynaphthalene. | Greenish grey. |
| (f) 4-chloro-2-aminophenol→1-methylsulphonylamino-7-hydroxynaphthalene, 2-aminophenol-4-ethylsulphone→1-acetylamiyo-7-hydroxynaphthalene. | Bluish grey. |
| (g) 4,6-dichloro-2-aminophenol→1-methylsulphonyl-amino-7-hydroxynaphthalene, 2-aminophenol-4-sulphomethylamide→1-acetylamino-7-hydroxynaphthalene. | Do. |
| (h) 4-acetylamino-6-nitro-2-aminophenol→1-methyl-sulphonylamino-7-hydroxynaphthalene, 2-aminophenol-4-ethylsulphone→1-benzenesulphonylamino-7-hydroxynaphthalene. | Greenish grey. |
| (i) 2-aminophenol-4-sulphonamide→1-methylsulphonyl-amino-7-hydroxynaphthalene, 4-nitro-2-aminophenol→1-butyrylamino-7-hydroxynaphthalene. | Grey. |
| (j) 2-aminophenol-5-sulphonamide→1-methylsulphonyl-amino-7-hydroxynaphthalene, 2-aminophenol-5-sulphonamide→1-acetylamino-7-hydroxynaphthalene. | Blue-grey. |
| (k) 2-aminophenol-4-methylsulphone→1-methyl-sulphonylamino-7-hydroxynaphthalene, 4-nitro-2-aminophenol→1-acetylamino-7-hydroxynaphthalene. | Grey. |
| (l) 1,4-dimethoxy-5-sulphonamide-2-aminobenzene→1-methylsulphonylamino-7-hydroxynaphthalene, 4-nitro-2-aminophenol→1-acetylamino-7-hydroxynaphthalene. | Greenish grey |

What is claimed is:

1. A mixed chromium complex azo dyestuff which contains in complex union one atom of chromium and two molecules of different monoazo dyestuffs of the formulae:

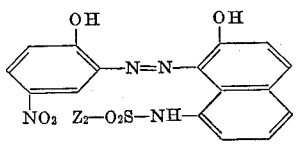

and

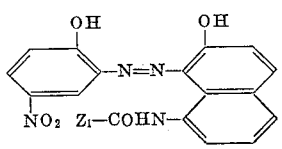

wherein $Z_1$ stands for methyl, ethyl, or phenyl, and $Z_2$ stands for methyl, ethyl, phenyl, or p-methylphenyl.

2. The dyestuff having the formula:

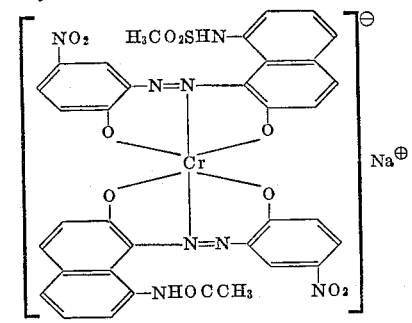

References Cited

UNITED STATES PATENTS 2,610,175  9/1952  Widmer et al. _____ 260—145

FOREIGN PATENTS 334,634  1/1959  Switzerland.
637,049  2/1962  Canada.

CHARLES B. PARKER, *Primary Examiner.*
D. PAPUGA, *Assistant Examiner.*

UNITED STATES PATENT OFFICE
CERTIFICATE OF CORRECTION

Patent No. 3,372,155                                March 5, 1968

Gerhard Dittmar et al.

It is hereby certified that error appears in the above numbered patent requiring correction and that the said Letters Patent should read as corrected below.

Column 1, lines 20 to 25, the formula should appear as shown below:

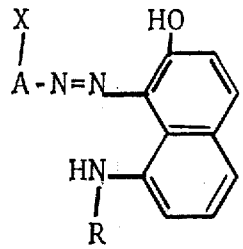

lines 27 to 32, the formula should appear as shown below:

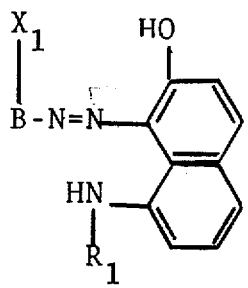

lines 52 to 58, the formula should appear as shown below:

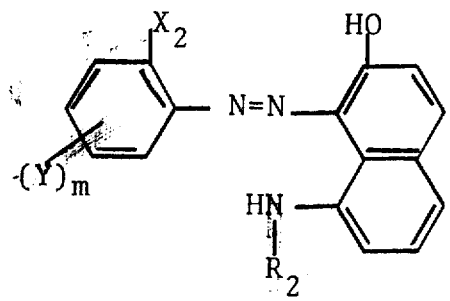

lines 60 to 66, the formula should appear as shown below

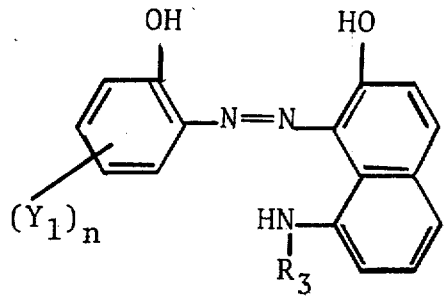

Column 2, line 9, "I and III" should read -- I and II --; line 11, "tape" should read -- type --; line 38, "compounds" should read -- components --. Column 3, line 44, "those" should read -- these --; line 60, "1938" should read -- 1939 --. Column 4, line 13, "5-dioxide" should read -- S-dioxide --; lines 61 to 73, the formula should appear as shown below:

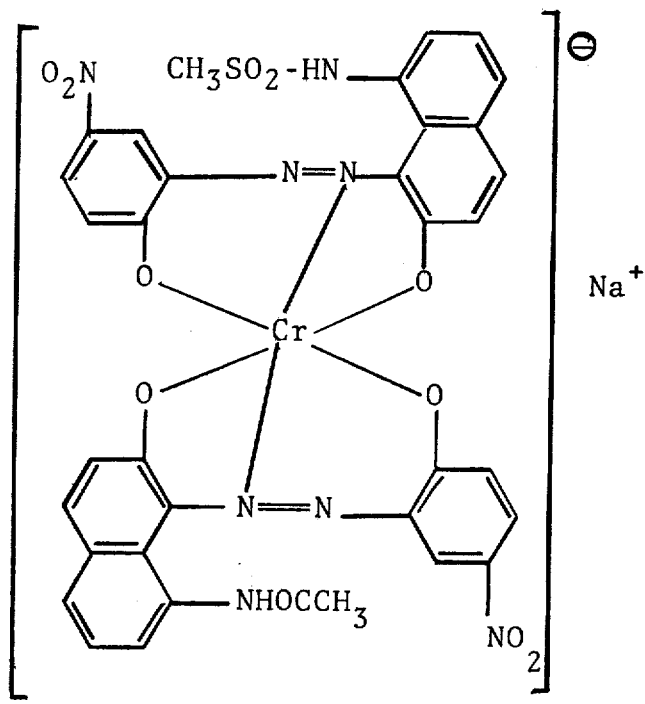

line 75, "dyeing" should read -- drying --. Column 5, line 16, "run in the" should read -- run into the --; line 44, "1-amino-2-methoxy-6-nitrobenzene" should read -- 1-amino-2-methoxy-4-nitrobenzene --; line 66, "crystaline" should read -- crystalline --. Column 6, line 8, "chrdomium" should read -- chromium --; line 60 (f), "→1-acetylamiyo-7-hydroxynaphthalene" should read -- →1-acetylamino-7-hydroxynaphthalene--. Column 7, lines 8 to 12, the bottom portion of the formula should appear as shown below:

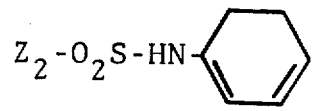

Signed and sealed this 23rd day of September 1969.

(SEAL)
Attest:

EDWARD M. FLETCHER, JR.
Attesting Officer

WILLIAM E. SCHUYLER, JR.
Commissioner of Patents